United States Patent [19]
Grolik et al.

[11] Patent Number: 5,755,018
[45] Date of Patent: May 26, 1998

[54] BENDING ELEMENT FOR THE TRIGGERING INDICATOR OF A BELT TENSIONER

[75] Inventors: Walter Grolik, Darmstadt; Jürgen Hess, Alsbach-Hähnlein; Ulrich Mohr-Matuschek, Kelkheim; Wilfried Derichs, Alzey; Karl Mies, Eppstein, all of Germany

[73] Assignee: Hoechst Aktiengesellschaft, Germany

[21] Appl. No.: 926,184

[22] Filed: Sep. 9, 1997

Related U.S. Application Data

[63] Continuation of Ser. No. 673,354, Jun. 28, 1996.

[30] Foreign Application Priority Data

Jun. 28, 1995 [DE] Germany .......... 195 23 413.8

[51] Int. Cl.⁶ .......... A44B 11/00; B60R 21/18; B60R 22/46
[52] U.S. Cl. .......... 24/685 B; 297/471; 24/71.1
[58] Field of Search .......... 24/685 B, 68 D, 24/69 WT, 129 A, 68 AS, 71.1, 265 A; 297/468, 470–427; 267/166.1, 167; 403/229

[56] References Cited

U.S. PATENT DOCUMENTS

| | | | |
|---|---|---|---|
| 2,622,664 | 12/1952 | Koehler et al. | 297/471 |
| 3,533,588 | 10/1970 | Cregier | 24/68 BT |
| 3,744,824 | 7/1973 | Sturmans | 297/471 |
| 3,827,652 | 8/1974 | Burchette, Jr. | 267/615 X |
| 4,144,620 | 3/1979 | Schaeffer | 24/71.1 |
| 4,203,305 | 5/1980 | Williams | 267/267 X |
| 4,601,367 | 7/1986 | Bongers | 297/472 X |
| 5,181,668 | 1/1993 | Tsuji et al. | 267/167 X |
| 5,207,618 | 5/1993 | Nishizawa | 297/468 X |
| 5,282,478 | 2/1994 | Fleischhaker, Jr. et al. | 403/229 X |
| 5,374,110 | 12/1994 | Hiramatsu | 280/806 X |
| 5,405,180 | 4/1995 | Föhl | 280/806 X |
| 5,443,302 | 8/1995 | Dybro | 297/470 X |
| 5,503,375 | 4/1996 | Balsells | 267/167 |
| 5,516,085 | 5/1996 | Piepenstock | 267/166.1 |

FOREIGN PATENT DOCUMENTS

| | | |
|---|---|---|
| 9112121.3 | 12/1991 | Germany . |
| 91 12 121.3 | 2/1992 | Germany . |
| 93 00 430.3 | 5/1993 | Germany . |

*Primary Examiner*—James R. Brittain
*Assistant Examiner*—Robert J. Sandy
*Attorney, Agent, or Firm*—Connolly & Hutz

[57] ABSTRACT

Bending elements for the triggering indicator of a belt tensioner.

The triggering indicator for belt tensioners in motor vehicles includes a helical bending element made of a thermoplastic material such as polyamide, polyester or polyacetal.

6 Claims, 2 Drawing Sheets

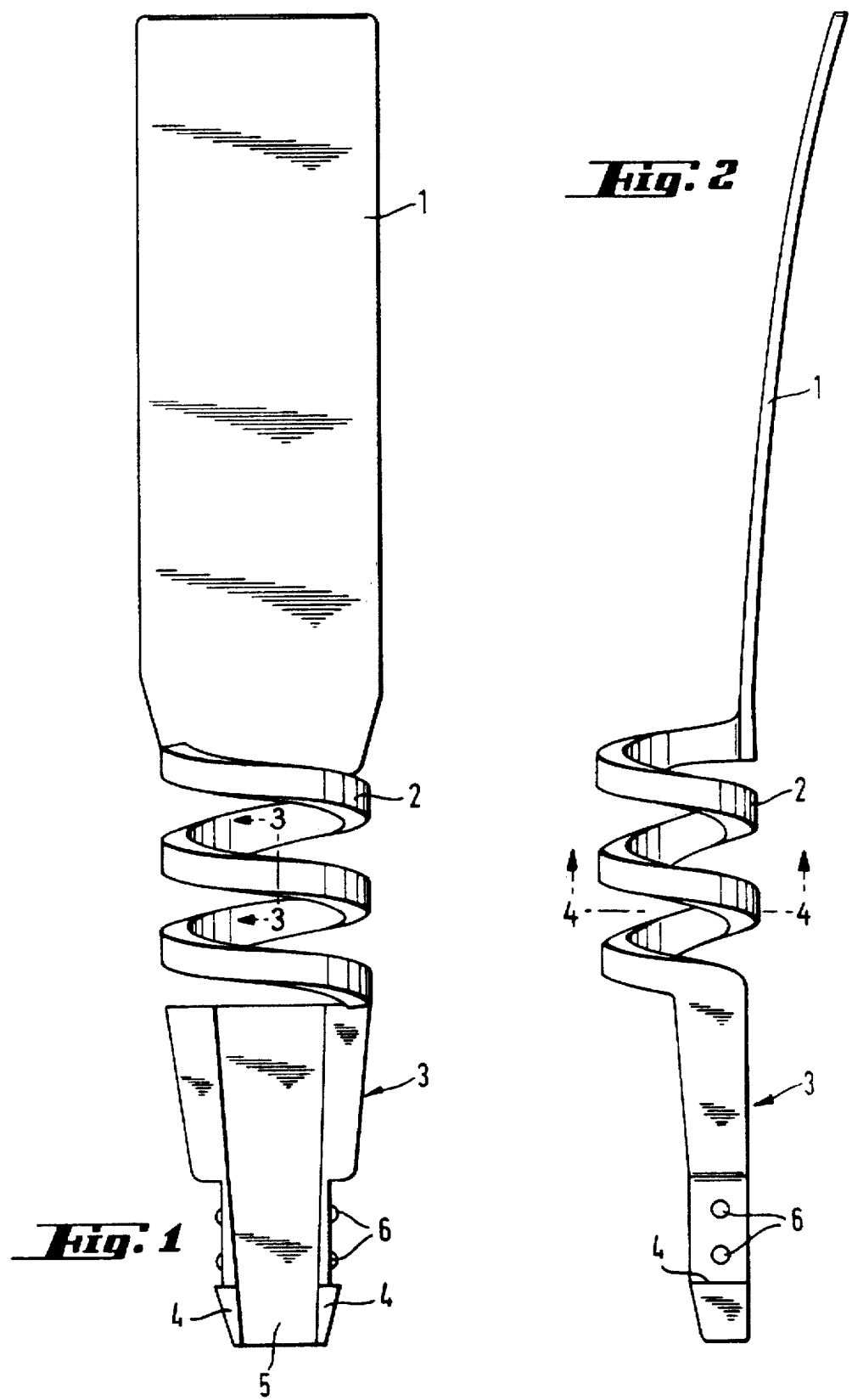

BENDING ELEMENT FOR THE TRIGGERING INDICATOR OF A BELT TENSIONER

This application is a continuation of application Ser. No. 08/673,354, filed on Jun. 28, 1996.

DESCRIPTION

Bending element for the triggering indicator of a belt tensioner.

The invention relates to a bending element made of plastic as part of a triggering indicator of a belt tensioner in belt buckles for safety belts in motor vehicles.

In the German Utility Model Application having the file reference G 9112121.3 of Sep. 28, 1991 entitled "Belt buckle connected to a belt tensioner", a description is given of a belt buckle with a flexible indicating part which indicates the triggering state of the belt tensioner. The flexibility of the indicating part is achieved by a shaft having a multiplicity of slots leading into it from both sides transversely with respect to the direction in which it principally extends and in the plane of the belt buckle. The flexibility of this part is not equal in all spatial directions.

The function of the triggering indicator described and illustrated in German Utility Model Application G 9112121.3 is as follows. When a sudden stop of the vehicle occurs, a belt tensioner 90 draws the rope 11 into the body of the belt tensioner. Simultaneously with such movement of rope 11, the buckle 4 moves in the direction of the holding element 6. However, the triggering indicator 14 is fixed at the U-shaped portion of holding area 16 and its upper part 21 becomes visible through gap 15 in the buckle 4 as soon as the buckle moves relative to the holding element. The triggering element 14 is fixed in that position as long as the belt tensioner 90 has expanded, and the operator of the vehicle then becomes aware of that condition as soon as he or she attaches clip 8 to the belt buckle. Such awareness is the result of the portion 21 of the triggering mechanism 14 being visible though the gap 15 in the belt buckle.

Triggering indicators have so far had the following major disadvantages:

They are designed such that they have adequate flexibility only in one plane. This has the effect in practice that they often rupture when subjected to bending stresses in directions outside the plane.

A multiplicity of holes and notches produce a very uneven stress diagram with high peak values.

Many joint lines reduce the strength and increase the probability of rupture.

The object of the invention was to provide a triggering indicator for belt tensioners with a bending element without the disadvantages mentioned. The object was achieved by a helical bending element made of plastic.

The subject of the invention is consequently a triggering indicator for belt tensioners in motor vehicles, including a helical bending element made of a thermoplastic material.

The triggering indicator according to the invention performs the functions as described for the triggering indicator in the already cited Utility Model G 9112121.3, to which reference is made.

The triggering indicator according to the invention is preferably a one-piece plastics molding.

The helical bending element has generally 1 to 10 turns, preferably 1 to 5 turns, with particular preference 2 to 3 turns.

The turns of the helical bending element preferably have a trapezoidal cross section. This improves the strength and makes it possible to produce the triggering indicator by the injection molding process.

The helical bending element may be of an elliptically flattened design. An elliptical shape of the helix makes it possible to fit the bending element into customary covers for belt buckles and to comply with packaging specifications, without significantly restricting the directional independence of the helix. The flexibility of the bending element can be adapted by changing the number of turns of the helix and/or by dimensioning the helix.

Examples of suitable thermoplastic materials for the triggering indicator according to the invention are polyamide, polyester and polyacetal.

Polyamides are polymers of which the units are joined by means of amide bonds. Polyamides which can be used according to the invention are described, for example, in "Ullmann's encyclopedia of industrial chemistry, ed. Barbara Elvers, 5th edition, Vol. A21, section on "Polyamides" (pp. 179–205), VCH Publishers, Weinheim-Basel-Cambridge-N.Y. 1992", to which reference is made.

Polyesters are polymers which contain recurring units joined by means of an ester group in the polymer chain. Polyesters which can be used according to the invention are described, for example, in "Ullmann's encyclopedia of industrial chemistry, ed. Barbara Elvers, 5th edition, Vol. A21, section on "Polyesters", (pp. 227–251), VCH, Weinheim-Basel-Cambridge-N.Y. 1992", to which reference is made. Examples of polyesters are polybutyleneterephthalate (PBT) or polyethyleneterephthalate (PET).

Examples of polyacetals are polyoxymethylene homopolymers and copolymers.

Polyacetals which can be used according to the invention are described, for example, in "Ullmann's encyclopedia of industrial chemistry, ed. Barbara Elvers, 5th edition, Vol. A21, section on "Polyoxymethylenes" (pp. 591–603), VCH, Weinheim-Basel-Cambridge-N.Y. 1992", to which reference is made.

The helical bending element of the triggering indicator results in the following advantages:

high deformability under flexural stress in all directions,
even stress distribution,
no notches or joint lines,
compatibility with conventional belt tensioner systems with triggering indication.

Even under a large bending angle in any desired direction, low strain values and low stresses are produced. The risk of rupture caused by exceeding permissible maximum strain values is thereby virtually excluded. Since the bending element can be produced without notches and joint lines, high stability under deformation is additionally ensured.

In addition to the isotropic flexibility, the triggering indicator according to the invention together with the tensioning cables also ensures the correct spatial position of the belt buckle before each fastening operation.

With a trapezoidal cross section of the turns of the helical bending element, simple removal from the injection mold is possible. As a result, the bending element can be produced in a simple, trouble free manner.

If the bending element is produced by the injection molding process, a very advantageous uniform molecular orientation is achieved in the material, since the cross section allows only one fixed flow direction, without the melt being diverted or divided.

The special embodiment of the bending element eliminates the need to use an impact modified material. The use of a type of material which has greater strength and rigidity is made possible.

Reduced component stresses in the bending element according to the invention and the use of a more rigid material, with the consequence of a reduced tendency to creep of the plastic, considerably reduce the risk of permanent deformation after sustained loading.

BRIEF DESCRIPTION OF THE DRAWINGS

FIG. 1 is a front elevational view of a triggering indicator for a belt tensioner in a belt buckle, according to the present invention;

FIG. 2 is a side elevational view of the triggering indicator shown in FIG. 1;

FIG. 1 (front view) and FIG. 2 (side view) show an example of a triggering indicator according to the invention. The triggering indicator shown comprises an indicating part (1), an adjoining helical bending element (2) and a connecting part (3). The connecting part (3) with latching projections (4) and protrusions (6) serves for latching connection. The connecting part (3) is provided with a groove-shaped guide channel (5), by which the cable of the belt tensioner is guided.

The triggering indicator shown in FIGS. 1 and 2 was produced, for example, in one part from polyoxymethylene by the injection molding process. In this example, the bending element has 2.5 turns.

Figure 3:
FIG. 3 is a sectional view taken along line 3—3 of FIG. 1.
Figure 4:
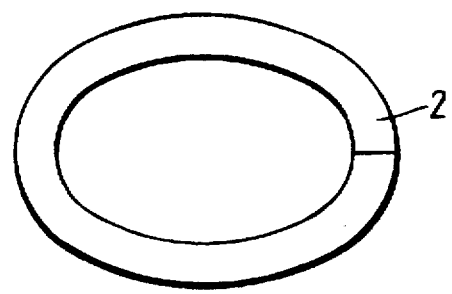
FIG. 4 is a sectional view taken along line 4—4 of FIG. 2.

FIG. 3 illustrates the trapezoidal cross section of the turns of helical bending element (2). Additionally, FIG. 4 illustrates that the helical bending element is ecliptically flattened. Specifically, FIG. 1 shows the front view of the helical bending element and it has a larger diameter when compared to the side elevational view of FIG. 2 where the helical bending element has a smaller diameter. This difference in diameter of the helical bending element when viewed at right angles produces the ecliptically flattened configuration.

We claim:

1. A triggering indicator for belt tensioners in motor vehicles, including a helical bending element having opposite ends and made of a thermoplastic material, an elongate indicator part integrally secured to one end of the helical bending element and extending therefrom also made of the same thermoplastic material as the helical bending element, and a connecting part integrally secured to the other end of the helical bending element for connection to a belt tensioner, the connecting part including a guide channel for a cable of a belt tensioner and also being made of the same thermoplastic material as the indicator part and the helical bending element.

2. The triggering indicator as claimed in claim 1, wherein polyamide, polyester or polyacetal is used as the thermoplastic material.

3. The triggering indicator as claimed in claim 1, wherein polyoxymethylene homopolymer or polyoxymethylene copolymer is used as the thermoplastic material.

4. The triggering indicator as claimed in claim 1, wherein the helical bending element includes a plurality of turns and wherein the cross section of the turns of the helical bending element is trapezoidal.

5. The triggering indicator as claimed in claim 1, wherein the helical bending element is elliptically flattened.

6. The triggering indicator as claimed in claim 1, wherein the helical bending element has 2.5 turns.

* * * * *